United States Patent [19]
Proksa et al.

[11] 4,452,917
[45] Jun. 5, 1984

[54] PROCESS AND A MIXING HEAD FOR THE PRODUCTION OF A REACTION MIXTURE COMPRISING AT LEAST TWO FLOWABLE REACTION COMPONENTS

[75] Inventors: Ferdinand Proksa, Leverkusen; Hans-Michael Sulzbach, Koenigswinter; Reiner Raffel, Siegburg; Ferdinand Althausen, Neunkirchen, all of Fed. Rep. of Germany

[73] Assignee: Maschinenfabrik Hennecke GmbH, Augustin, Fed. Rep. of Germany

[21] Appl. No.: 509,614

[22] Filed: Jul. 1, 1983

[30] Foreign Application Priority Data

Jul. 15, 1982 [DE] Fed. Rep. of Germany ....... 3226412

[51] Int. Cl.³ ............................................. G01F 11/06
[52] U.S. Cl. ..................................... 521/50; 141/107; 222/136; 222/137; 222/145; 222/149; 222/309; 222/322; 222/380; 222/409; 222/561; 222/564; 425/130; 425/257
[58] Field of Search ................. 521/50; 222/136, 137, 222/145, 149, 309, 322, 380, 409, 561, 564; 141/107; 425/130, 257

[56] References Cited

U.S. PATENT DOCUMENTS

| | | | |
|---|---|---|---|
| 3,263,928 | 8/1966 | Gusmer | 239/123 |
| 3,771,963 | 11/1973 | Breer et al. | 23/252 |
| 3,924,989 | 12/1975 | Althausen et al. | 425/130 |
| 3,975,128 | 8/1976 | Schulter | 425/207 |
| 3,982,870 | 9/1976 | Boden et al. | 425/252 |
| 4,115,299 | 9/1978 | Mühle | 521/170 |
| 4,141,470 | 2/1979 | Schulte et al. | 222/137 |

FOREIGN PATENT DOCUMENTS 1779037 10/1972 Fed. Rep. of Germany .
2847504 5/1980 Fed. Rep. of Germany .

*Primary Examiner*—Maurice J. Welsh
*Attorney, Agent, or Firm*—Gene Harsh; Joseph C. Gil

[57] ABSTRACT

A process and a mixing head for the production of a reaction mixture comprising at least two reaction components, with a high degree of mixing. By this process, reaction components are introduced, at a high pressure into one end of the mixing chamber of the mixing head, these components being deflected by the front of the discharge piston which forms the opposite end of the chamber, a counterflow forming intensive turbulences on the wall of the mixing chamber and on the boundary surface with the incoming flow before this counterflow exits the mixing chamber at the same end through which it entered the chamber, substantially as a radially-directed, laminar flow.

10 Claims, 3 Drawing Figures

PROCESS AND A MIXING HEAD FOR THE PRODUCTION OF A REACTION MIXTURE COMPRISING AT LEAST TWO FLOWABLE REACTION COMPONENTS

This invention relates to a process and a mixing head for the production of a reaction mixture wherein at least two flowable reaction components are injected, substantially in an axial direction, as at least one jet into a mixing zone and are deflected by the opposite end of the mixing zone and removed from that mixing zone.

BACKGROUND OF THE INVENTION

Depending on the starting components, reaction mixtures of the type to which this invention is directed form solid, microporous materials or foams, particularly, for example, polyurethane foams. In spite of the high standards which have been attained, the production of perfect moldings, for which a homogeneous mixing of the reaction components is a prerequisite, from such reaction mixtures in molds constantly imposes new demands on machine technology and production engineering.

To meet the requirements which have been imposed, high pressure mixing heads with counterflow injections and optional cleaning pistons have won recognition (U.S. Pat. No. 3,263,928). Since these mixing heads have to produce relatively small quantities of mixture to fill the cavity of a typical mold and require a high throughput per time unit in the continuous mixing process, deficiencies have resulted in thoroughness of the mixing, however. Disadvantages caused by the intrusion of air due to the turbulent flow during introduction of the mixture into the cavity of molds have been observed. Attempts have been made to overcome these disadvantages through the use of after-mixers connected downstream of the actual mixing chamber, or choke points which are to ensure a corresponding after-mixing and, in conjunction with a long outflow channel, to ensure a laminar flow upon entry of the components into the mold cavity (U.S. Pat. Nos. 3,924,989; 3,975,128 and 4,141,470).

Although these further developments presently meet the requirements which have been made, they are so expensive and, because of the additional apparatus involved, susceptible to failure, that simplified solutions are being sought.

An object of the present invention is to provide a process in which the mixing operation takes place in a single zone at a high intensity and in which the flow of reaction mixture leaving the mixing zone has already attained a high level of stabilization. Moreover, a mixing head is provided which ensures the necessary mixing intensity of components as well as that the outflow from the mixing chamber is as homogeneous as possible, and that the chamber is also to be self-cleaning in a known manner.

DESCRIPTION OF THE INVENTION

Figure 1:
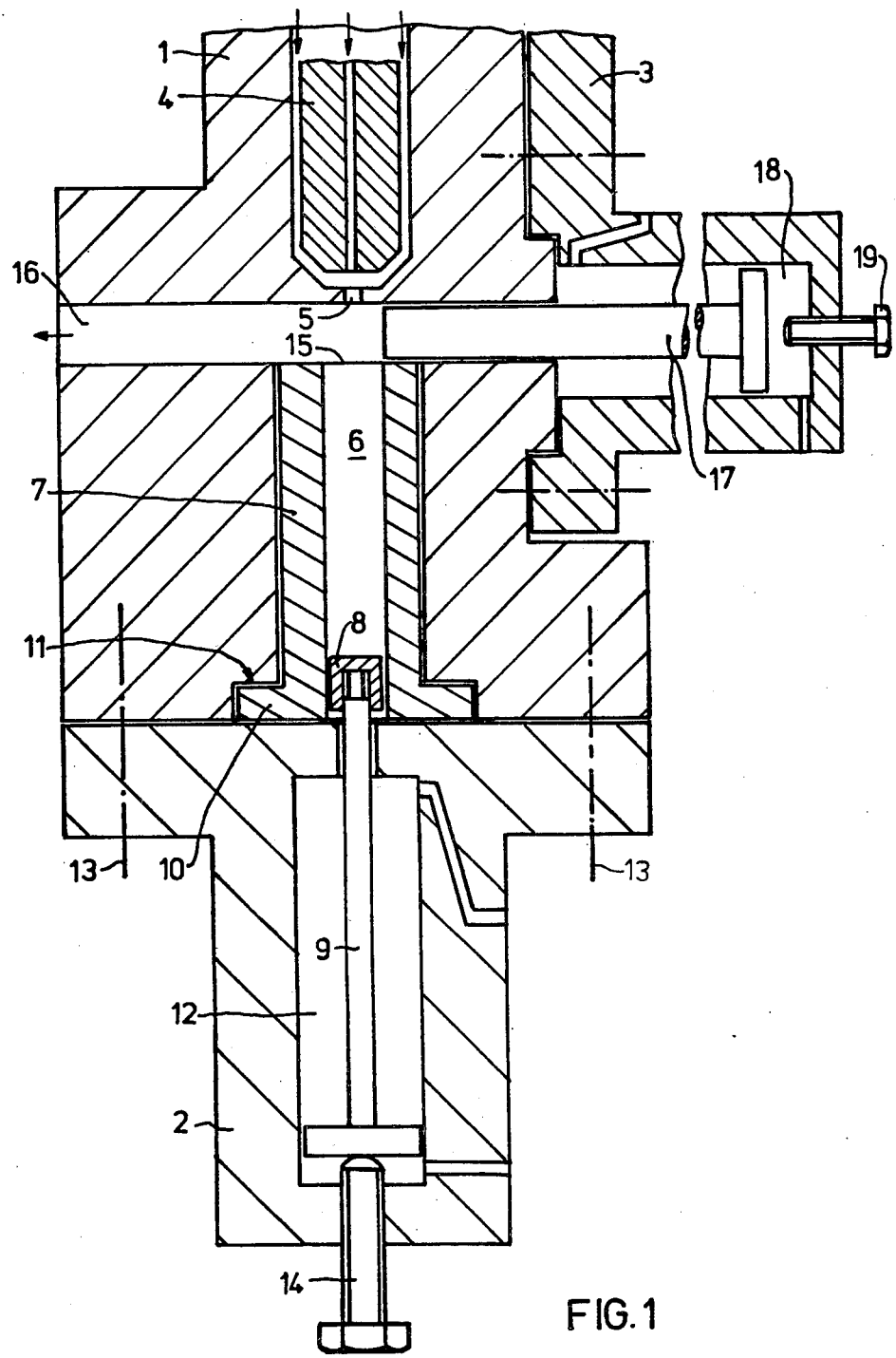
FIG. 1 illustrates a first embodiment of the mixing head.

With respect to the process, this object is achieved in that the reaction components are injected into a mixing chamber at a high pressure and after being deflected by the end of the chamber opposite the end through which the components are injected, are guided in a counterflow to and surround the entering jet, with turbulent mixing occurring at the boundary surface which forms between the incoming jet and the counterflow.

Consequently, an intensive mixing is achieved in the smallest space. Turbulence occurs essentially only at the boundary surface within the mixing chamber, with the outer (counterflow) layer quickly stabilizing as it approaches the inlet/outlet opening. The thoroughly homogenized reaction mixture which is thus produced preferably exits from the mixing chamber substantially in the form of radially-directed, laminar flow. A subsequent mixing operation is, therefore, unnecessary and, as flow velocity rapidly decreases within the mixing chamber, the risk of splashing and the intrusion of air into the reaction components are substantially reduced.

By this process, it is possible to inject the combined reaction components as one or more jets, or each reaction component may be injected as one or more jets, the latter embodiment being favored in the case of components which are difficult to mix.

Injecting the jets at an angle of at most 10° to the axis of the mixing zone may also promote the mixing of components which are difficult to mix. The required formation of the boundary surface is retained with this slight inclination, but vortex motion occurs at the point of intersection of the jets.

According to another embodiment of the present process, the dynamic pressure in the mixing zone is effected by the choice of actual chamber diameter and the influent nozzle pressure. The ratio of the cross-sections of the entering jet and of the counterflow is adjusted by changing these parameters. In this way, the mixing chamber pressure which contributes to cell formation and/or cell size properties in foam-forming mixtures may be affected without flow-modifying baffles or throttling of the inlet/outlet opening of the chamber. With this new process, the incoming jet or jets actually cause a so-called "chambering" effect in the mixing chamber by acting as a throttle itself on the counterflow at the inlet/outlet of the chamber.

The mixing head for carrying out the new process comprises a housing having a cylindrical mixing chamber into which is directed at least one nozzle opening for the reaction components and which provides an outlet for the reaction mixture. The novelty of this mixing head is to be seen in the combination of the following features:

(a) the reaction components enter and exit on the same end of the mixing chamber, (b) the end of the mixing chamber opposite the inlet/outlet opening is the front of a discharge piston, and (c) the length of the mixing chamber is greater than its diameter.

Due to this design and contrary to the prior art, the reaction components are introduced into the mixing chamber from the same point or approximately the same point and the mixture which forms undergoes a strong turbulent mixing effect along the boundary surface between the incoming mixture and the counterflow mixture and on the mixing chamber walls. As a consequence, the mixing procedure is greatly intensified, and the reaction mixture leaves the mixing chamber as a rapidly-stabilizing radially directed laminar flow. The mixing operation which occurs within the chamber may be optimized by a suitable choice of the pressure of the incoming component and the diameter and length of the mixing chamber. A discharge piston known in the art ensures the cleaning of the mixing chamber. The design of the thin, cylindrical mixing chamber, with the length of the mixing chamber preferably being from two to five times its diameter, promotes the turbulent mixing which occurs on the boundary surface between the incoming injection jet and the counterflow stream.

A mixing head in which the inlet opening for the combined components is positioned on one side of the mixing chamber is already known from U.S. Pat. No. 3,771,963. However, the desired counterflow effect achieved with the instant invention cannot take place in this mixing chamber, because the outlet opening is positioned approximately half way along the side of the mixing chamber. Further, the mixing chamber is not self-cleaning and the residual mixture has to be rinsed from the chamber or alternatively the chamber may be integrated into the article produced, an option which can no longer be employed due to strength and aesthetic considerations.

In another known mixing head (German Pat. No. 1,779,037), pivoted injection nozzles are provided which are directed into the mixing chamber opposite the outlet opening, at least at the start of the mixing procedure. In this arrangement, the nozzles enclose an angle of from 45° to 160°. Because of the positioning of these nozzles, however, it is impossible for the injection jet and the reflected counterflow stream to mix on the boundary surface in this mixing chamber. A transverse mixing and partial counterflow effect is created, resulting in an uncontrollable turbulence in the mixing chamber. As a result, a mixing which is adequate by current requirements cannot be ensured. Also, this mixing chamber may only be cleaned by rinsing.

Finally, a self-cleaning mixing head is known from U.S. Pat. No. 3,982,870 which is related to the apparatus of U.S. Pat. No. 3,263,928. The mixing chamber of U.S. Pat. No. 3,982,870 is positioned in one half of a mold, with a recess or receiving chamber being provided in the other half of the mold opposite the mixing chamber in which a discharge piston is guided. This recess is used for collecting unmixed or still-poorly-mixed portions of reaction mixture from the mixing chamber which are to be intensively mixed in this recess with subsequent charges of reaction mixture from the mixing chamber. However, the actual mixing procedure takes place in the mixing chamber itself. In particular, the desired counterflow of reaction mixture never forms in this mixing head either.

In the case of the instant mixing head, it is critical that the reaction components are introduced into the mixing chamber from one end. The multi-substance nozzle known from U.S. Pat. No. 3,771,963, in which the reaction components are combined shortly before entering into the mixing chamber, may be used. However, one or more separate nozzle openings may also be provided for each reaction component. In this alternative design, in order to achieve the required counterflow and the vortex motion on the boundary surface between incoming jet and counterflow streams, care must be taken that the incoming jets are directed, as much as possible, parallel to the axis of the mixing chamber or are at a very acute angle of at most 10°.

According to a particular embodiment, the homogenized reaction mixture discharges from the mixing chamber into an outlet channel. This outlet channel contains a cleaning piston which touches the front of the discharge piston in its cleaning position. Although this outlet channel and cleaning piston resemble the quieting chamber of the mixing head according to U.S. Pat. No. 3,975,128, the channel of the instant invention is merely a path between the mixing chamber and the mold cavity, it is not required to perform the functions of the quieting chamber of U.S. Pat. No. 3,975,128. Nevertheless, even that function may be achieved with the channel, with suitable cross-sectional dimensioning and a suitable length of the outlet channel. In addition, the cleaning piston could also be used for throttling the mixture discharging from the mixing chamber.

Another embodiment is characterized by the allocation of the mixing head to a mold, the dividing plane of which also runs between the nozzle opening and the inlet/outlet opening of the mixing chamber. In this embodiment, the nozzle opening for the reaction components is located in one half of the mold, with the mixing chamber itself in the other half of the mold, so that the mold cavity extends inbetween. This embodiment has the particular advantage that the counterflow discharging from the mixing chamber in a radially-directed, laminar flow is distributed uniformly in the mold cavity, with a rapid decrease in flow velocity.

It is obvious that a sprue runner may optionally also be provided in this embodiment. In this case, the mixing chamber is not directly positioned in the region of the mold cavity. However, if a cleaning piston is not provided in the outlet channel, the mold dividing plane has to extend through the outlet channel such that when the mold is open, the remainder of the mixture which has completely reacted in the outlet channel may also be released from the mold.

The length of the mixing chamber may, of course, be adjusted by the positioning of the discharge piston. This measure provides the possibility of adapting the mixing chamber to the mixing properties of the reaction components or to the other parameters, such as injection pressures and mixing chamber pressure, and of optimizing the mixing chamber with respect thereto.

According to another particular embodiment, the wall of the mixing chamber is formed by an exchangeable insert sleeve which may be removably-fixed in the housing. In this embodiment, the discharge piston has an exchangeable head, wherein the insert sleeves and piston heads are coordinated with each other, the sleeve with respect to its internal diameter and the head with respect to its external diameter. By this means, the mixing chamber diameter may also be adapted to requirements, as a result of which, particularly, the mixing chamber pressure may be influenced.

The mixing head illustrated in FIG. 1 comprises three housing parts 1, 2 and 3. A two-substance nozzle 4, corresponding in construction to the nozzle of U.S. Pat. No. 3,771,963, is positioned in the housing part 1. An opening 5 extends axially into a mixing chamber 6. The wall of the chamber 6 is formed by an exchangeable insert sleeve 7 in which an exchangeable head 8 of a discharge piston 9 is guided. Various combinations of insert sleeves 7, and piston heads 8 which have different, coordinated diameters, are associated with the mixing head. The sleeves 7 have centering collars 10 which fit into a centering annular groove 11 provided in the housing part 1.

An hydraulic drive 12 of the discharge piston 9 is located in the housing part 2 which is attached to the housing part 1 by screws 13 and simultaneously helps to secure the sleeve 7. The length of the mixing chamber 6 may be modified through the use of a stroke-restricting screw 14. Also, an outlet channel 16, which joins inlet/outlet opening 15 and which leads into a mold cavity (not shown), is also provided in the housing part 1. A cleaning piston 17 is guided in the outlet channel 16, with an hydraulic drive 18 for the piston 17 being positioned in the housing part 3. The cleaning piston 17 may also be used for throttling the crosssection of the outlet opening 15 with the help of an adjusting screw 19. It is obvious, however, that the nozzle opening 5 must not be covered during the mixing procedure.

It is also obvious to those skilled in the art that the operation of the two-substance nozzle 4 and the operation of the hydraulic drives 12 and 18 have to be exactly coordinated with one another. First, the two-substance nozzle 4 is closed at the end of the mixing procedure. The hydraulic drive 12 actuates the discharge piston 9 which empties the mixing chamber 6 and withdraws to its initial position at the end of the mixing chamber. Finally, the cleaning piston 17 is operated by the hydraulic drive 18 and it discharges the rest of the mixture from the outlet channel 16. In order to prepare for a new mixing procedure, the steps are carried out in the reverse order.

Figure 2:
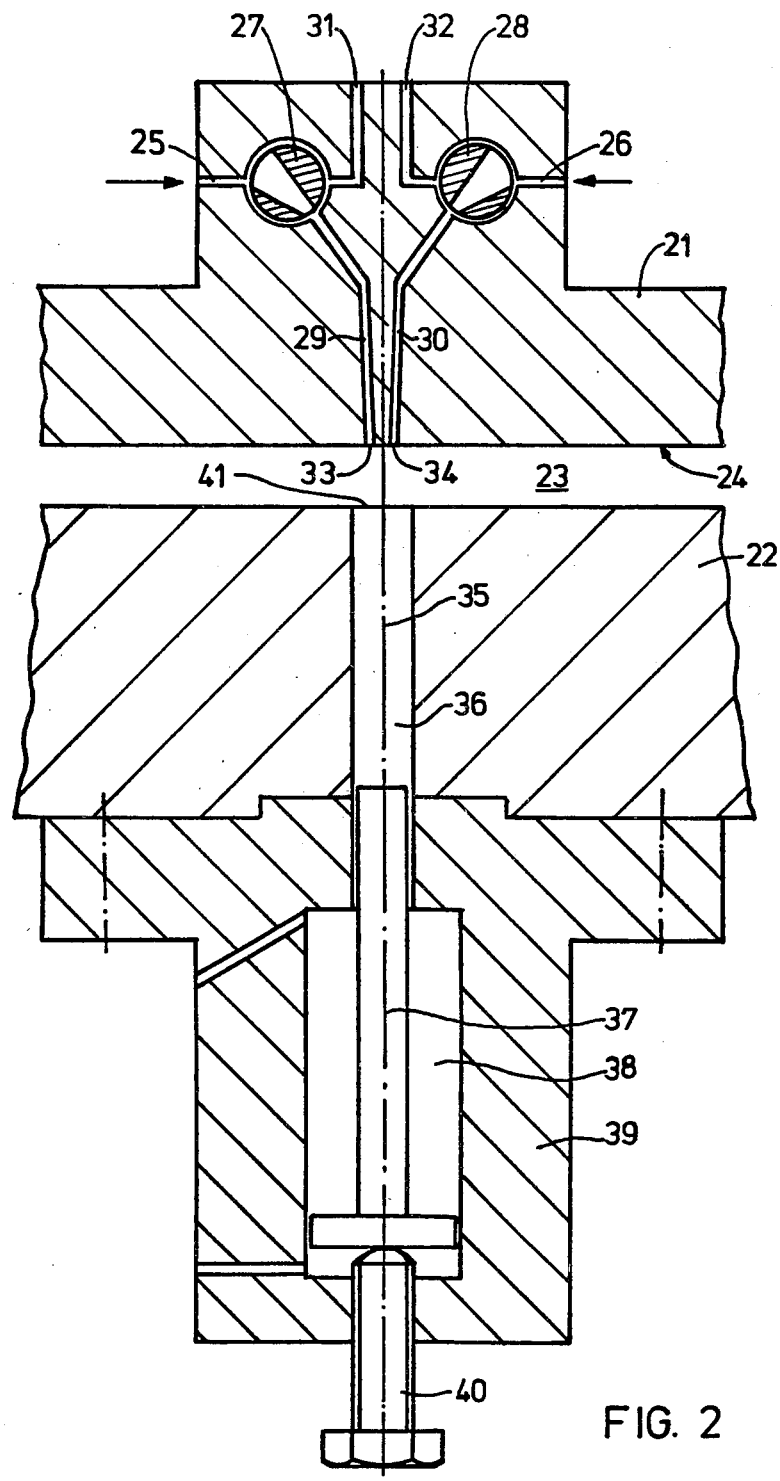
FIG. 2 illustrates a mixing head integrated in one half of a mold.

The mixing head in FIG. 2 is integrated into the mold halves 21 & 22 of a mold, the mold cavity 23 being located between the halves. The mold dividing plane is designated by reference numeral 24. Supply lines 25 and 26 for the polyol and isocyanate reaction components lead to reversing valves 27 and 28, which in one position (as shown) connect the supply lines 25 and 26 to supply line bores 29 and 30, and in the other position connect them to return lines 31 and 32. The supply line bores 29 and 30 open into injection openings 33 and 34 which are provided symmetrically to the center axis 35 of mixing chamber 36 which is positioned opposite in the mold half 22. The incoming supply lines 29 and 30 enclose an angle of 3° towards the center axis. A discharge piston 37 is guided in the mixing chamber 36 and the hydraulic drive 38 of the piston 37 is located in a housing 39 attached to the mold half 22. A stroke restricting screw 40 makes it possible to adjust the length of the mixing chamber 36. The inlet/outlet opening of the mixing chamber 36 is designated by reference numeral 41.

It is obvious that in this embodiment as well, the mixing chamber 36 may be lined with an exchangeable inserted sleeve to which is allocated an exchangeable discharge piston head of a suitable external diameter and is positioned on the discharge piston 37.

Correspondingly-modified embodiments of the mixing heads which are illustrated in FIGS. 1 and 2 may also be detachably-secured to the mold halves as so-called "mounted mixing heads". In this case, the mold dividing plane is also guided through the mixing chamber.

Figure 3:
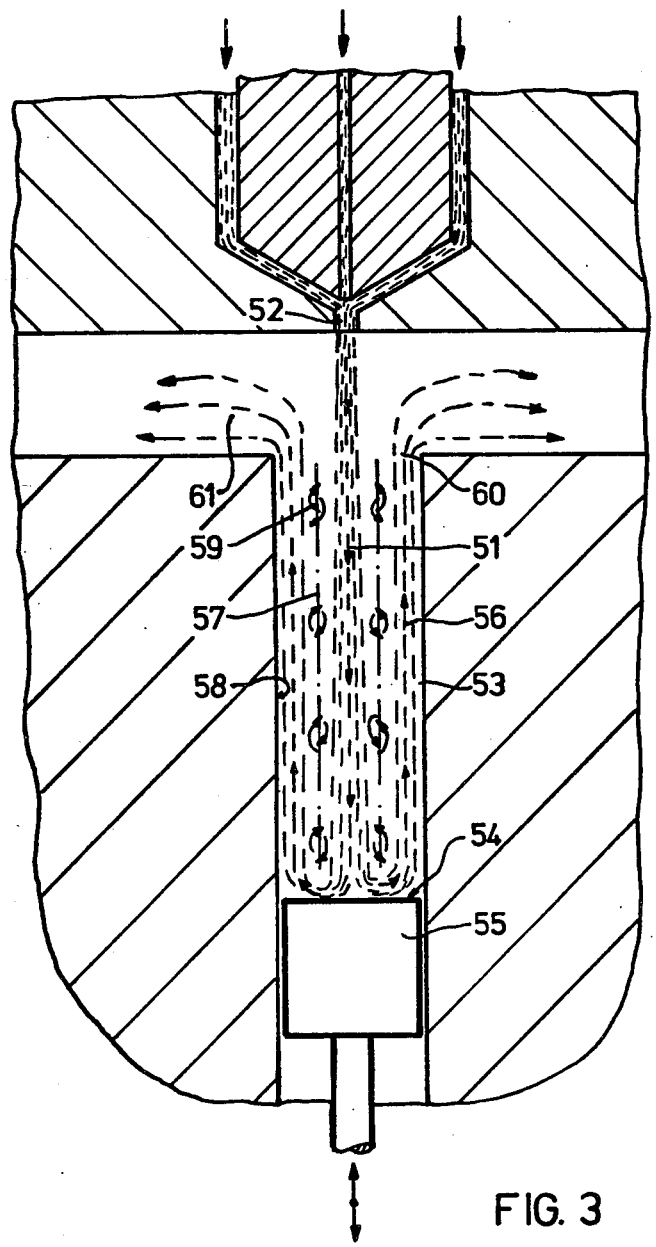
FIG. 3 illustrates the flow path in the mixing chamber.

FIG. 3 shows that the reaction components are injected centrally into a mixing chamber 53 through an inlet opening 52 as a common jet 51, until they meet the front 54 of a discharge piston 55 which deflects the jet 51. Turbulences 59, which ensure intensive mixing, form at the annular boundary surface 57 between the jet 51 and the counterflow 56 and between the counterflow 56 and the wall 58. The counterflow leaves the mixing chamber 53 through the inlet/outlet opening 60 as a radial source flow 61, the velocity of which greatly decreases in an advantageous manner in the direction of flow, the flow quickly becoming laminar. The jet 51 does not cause any disturbance in the radial source flow 61 because it enters centrally into this flow.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a plastics-forming reaction mixture comprising at least two flowable reaction components which are injected as an incoming flow at high pressure into one end of a mixing chamber, substantially in an axial direction, are deflected at the opposite end of the mixing chamber, and exit from the mixing chamber, characterized in that after being deflected, the reaction components proceed in a counterflow to the incoming flow, while surrounding this incoming flow, with the formation of a boundary surface between this incoming flow and the counterflow, the incoming flow being mixed with the counterflow along the boundary surface.

2. A process according to claim 1, characterized in that the reaction mixture which is produced exits the mixing chamber substantially in the form of a radially-directed, laminar flow.

3. A process according to claim 1, characterized in that each reaction component is injected in the form of at least one separate jet.

4. A process according to claim 3, characterized in that the separate jets are injected at an angle of at most 10° to the axis of the mixing zone.

5. A process according to claim 1, characterized in that the dynamic pressure in the mixing zone is effected by the choice of actual chamber diameter and the influent nozzle pressure.

6. A mixing head for the production of a plastics-forming reaction mixture comprising at least two flowable reaction components, comprising a housing having a cylindrical mixing chamber into which is directed at least one nozzle opening for the reaction components and which has an opening for the reaction mixture to exit the chamber, characterized in that:
   (a) the reaction components enter and exit on the same end of the mixing chamber,
   (b) the end of the mixing chamber opposite the inlet/outlet opening is the front of a discharge piston, and
   (c) the length of the mixing chamber is greater than its diameter.

7. A mixing head according to claim 6, characterized in that the opening through which the mixture enters and leaves the chamber discharges into an outlet channel to which a cleaning piston is allocated which touches the front of the discharge piston in its cleaning position.

8. A mixing head according to claim 6, characterized by the allocation to a mold, the mold dividing plane of which also extends between the inlet opening on one side and the discharge position of the discharge piston on the other side.

9. A mixing head according to claim 6, characterized in that the length of the mixing chamber may be adjusted by the positioning of the discharge piston.

10. A mixing head according to claim 6, characterized in that the wall of the mixing chamber is formed by an exchangeable insert sleeve which may be fixed in the housing, and the discharge piston has an exchangeable head, the insert sleeve and the piston head diameters being coordinated with each other, the sleeve with respect to its internal diameter, and the head with respect to its external diameter.

* * * * *